United States Patent [19]

Jacobson

[11] Patent Number: 5,191,830
[45] Date of Patent: Mar. 9, 1993

[54] BAKING APPARATUS FOR MAKING CUP-SHAPED COMESTIBLES

[76] Inventor: Fred M. Jacobson, 1978 Fairway Circle Dr., Lake San Marcos, Calif. 92069

[21] Appl. No.: 908,482

[22] Filed: Jun. 30, 1992

Related U.S. Application Data

[63] Continuation of Ser. No. 578,397, Sep. 7, 1990, abandoned.

[51] Int. Cl.$^5$ ............................................. A23P 1/00
[52] U.S. Cl. ...................................... 99/439; 99/428; 99/DIG. 15; 249/120; 249/122
[58] Field of Search .................. 99/432, 433, 353, 372, 99/382, 383, 426, 428, 439-442, DIG. 15; 220/315, 507, 523; 249/119-122, 134, 160, 163, 165-169, DIG. 1; D7/354, 360

[56] References Cited

U.S. PATENT DOCUMENTS

| | | | |
|---|---|---|---|
| 942,092 | 12/1909 | May | 249/121 X |
| 1,342,045 | 6/1920 | Hamwi | 99/383 |
| 1,831,147 | 11/1931 | Smith | . |
| 1,896,849 | 2/1933 | Newman | 249/121 X |
| 2,078,102 | 4/1937 | Siela | 99/439 |
| 2,168,006 | 8/1939 | Strietelmeier | 99/383 X |
| 2,932,386 | 4/1960 | Ushkow | 249/121 X |
| 3,179,287 | 4/1965 | Rickmeier, Jr. | 220/315 X |
| 3,296,956 | 1/1967 | Turner | . |
| 3,374,982 | 3/1968 | Sallade | 249/121 |
| 3,375,791 | 4/1968 | Pakula | 99/383 X |
| 3,379,120 | 4/1968 | Fogle | 99/439 |
| 3,385,205 | 5/1968 | McCloud | . |
| 3,590,728 | 7/1971 | Stanley | 99/439 |
| 3,727,875 | 4/1973 | Downing | 99/426 X |
| 3,776,504 | 12/1973 | Wiley | 249/121 |
| 3,979,016 | 9/1976 | Frater | 220/315 |
| 4,147,324 | 4/1979 | Walter | 249/121 X |
| 4,216,763 | 8/1980 | Miklas | 99/426 X |
| 4,286,136 | 8/1981 | Mason, Jr. | . |
| 4,348,949 | 9/1982 | Selleck | . |
| 4,478,349 | 10/1984 | Haverland et al. | . |
| 4,574,174 | 3/1986 | McGonigle | . |
| 4,644,858 | 2/1987 | Liotto et al. | . |

FOREIGN PATENT DOCUMENTS

| | | | |
|---|---|---|---|
| 911812 | 10/1972 | Canada | 99/426 |
| 2551693 | 3/1985 | France | 99/426 |

Primary Examiner—Philip R. Coe
Assistant Examiner—Mark Spisich
Attorney, Agent, or Firm—Knobbe, Martens, Olson & Bear

[57] ABSTRACT

A baking apparatus for baking cup-shaped comestibles comprising an upper and lower tray is disclosed. Together the trays form a plurality of baking chambers when the two trays are assembled and locked together. The bottom tray is configured with a plurality of cup-shaped bottom molds that are aligned in a rectilinear grid fashion. The top tray is similarly aligned and includes a plurality of concave mold covers that are used to define the hollow center of the comestible cup. Portions of un-baked, leavened food products are placed in the bottom molds and the baking apparatus includes a means for locking the upper and lower trays in place to maintain secure engagement of the trays as the leavened food rises during baking. In the preferred embodiment, the locking means comprises a plurality of raised eyelets on the lower tray, which extend through corresponding openings in the upper tray. Once brought together, the trays are held in place by inserting T-shaped sliding rods through the eyelets. In addition, the baking apparatus of the present invention is constructed of a hard durable plastic suitable for both microwave and conventional oven use.

22 Claims, 5 Drawing Sheets

BAKING APPARATUS FOR MAKING CUP-SHAPED COMESTIBLES

"This application is a continuation of application Ser. No. 07/578,397, filed Sept. 7, 1990," abandoned.

FIELD OF THE INVENTION

The present invention generally relates to plastic cooking ware for baked goods and more particularly to a device for baking foods into molded shapes; the device utilizing the concept of interlocking trays to form a series of baking chambers.

BACKGROUND OF THE INVENTION

For years bakers have utilized available kitchen wares to bake edible goods into various shapes and sizes. Ranging from the haughty angle food gateaux to Proust's comforting Madelaines, the shape of the resulting baked product is primarily determined by the configuration of the baking receptacle into which the uncooked dough is placed. Thus, bakers have long experimented with bakeware of varying geometric shapes and sizes. One result of the experimentation has been the creation of a baked product formed in the shape of a hollow cup.

Surrounded by a circular outer wall of dough and supported by a dough base, the central cavity of the cup may be filled with numerous types of food fillers, such as pastry creams and ice creams, syrups and sauces, creating innumerable variations on a dessert filling theme. Similarly, nutritious entrees, such as those using meats and vegetables are also possible, using, for example, a cornbread dough. In any case, the culinary result of an outer, edible baked dough shell with an inner filling is functional, aesthetically pleasing, and provides an altogether different culinary experience to the palate.

The conventional device for creating a molded comestible is a bakeware system of lower and upper trays, in which each tray is configured to form one or more hollowed interior baking chambers when the trays are assembled in a nested relationship. The lower tray is generally configured with a series of receptacles, much like the conventional cupcake baking tray so familiar to homemakers. The upper tray is similarly configured with a series of corresponding cup-like depressions of smaller diameter than the receptacles of the lower tray. Mating the lower and upper baking sheets creates baking chambers that are defined by the bottom, outside surfaces of the upper tray depressions and by the upper, inside surfaces of the lower tray receptacles. Prior to assembly, a leavened baking mix of choice is placed in each of the receptacles of the lower tray. After the upper tray is mated to and assembled therewith, the combined trays are placed in an oven for baking. The heat causes the leavened mix to rise and assume the shape of the baking chamber. The result is a molded comestible that is available to be filled as discussed above.

A recurring difficulty in this field has been the difficulty in creating a baked, cup-shaped comestible that remains palatably pleasing throughout and yet is structurally capable of holding liquid-based fillers. Predictably, after the passage of a short period of time the liquid filler would become absorbed into the sides and bottom of the baked comestible cup, thereby weakening its structural integrity. Often the cup would collapse, ruining its aesthetic appearance as well as its functional effectiveness.

Previous attempts to generate cup-shaped food products capable of satisfactory periods of shelf time while filled with foods of liquid consistencies have met with only limited success. It remains desirable to delay the final assembly of placing the fillings in the baked cup until just prior to serving. Of course, if not filled, the baked cups have a tendency to become stale as well as damaged in transit and storage.

It would be desirable to be able to bake the cups on site, just prior to assembly. However, to date the bakeware required to make the baked cup products have been made of metal and their utility is of limited value in this day and age of microwave convenience. In addition, although many of the present baking devices consist of dual trays locked to one-another transversely, most are not similarly secured in a perpendicular direction. Consequently, as the leavened mix rises during baking, the trays are forced apart. Such separation effectively enlarges the baking chamber, and results in undesired bulges in the final baked product. Even for such bakeware as provides effective locking in both transverse and perpendicular directions, the locking mechanism is often cumbersome to operate, consisting of discrete components that must be assembled and attached to the baking pan before use.

To date, others have been unable to develop a lockable, two-piece baking apparatus suitable for microwave use that is also effective in producing comestibles capable of retaining a well defined cup-shape while filled with liquid based fillers. It would therefore be a novel improvement to bake comestible cups by providing a bakeware suitable for both conventional oven and microwave use. Such baking apparatus would be useful both to the large-scale bakers and their commercial ovens, as well as to enable on-site baking by fast food operations using their microwave ovens. This latter group would thus be positioned to offer comestible cups produced on-premises. Such freshly produced cake products will naturally retain their shape for a longer period of time than is the case for pre-filled cups—fresh or frozen. In addition it would be a novel improvement to design a two-piece baking apparatus that may be locked together in orthogonal directions, both transversely and perpendicularly, to prevent separation and ensure a well-defined cup shape during the baking process, and wherein the locking mechanism is integral with the trays and permits the quick and easy assembly and disassembly of the two-piece bakeware.

SUMMARY OF THE INVENTION

The novelty of the present invention rests in the configuration of two interlocking trays and the associated locking mechanism. The baking apparatus of the present invention consists of an upper and lower tray that form a series of baking chambers when placed one-on-top-of-the-other ("nested") in a mated, locked assembly. The lower tray is configured with a series of cup-shaped vessels or mold bottoms, aligned in a rectilinear grid fashion. The upper tray is similarly configured, with a matching matrix of cup-shaped, concave mold covers, concentrically aligned with the cup-shaped, mold bottom vessels of the lower tray. The baking chambers formed by the assembly of the dual trays define a volume, a portion of which is designed to hold the desired food mix prior to baking. When the tray assembly is heated—either by being placed in an oven or in a microwave unit, the expanding food mix assumes the shape of the cavity. The resulting food cup is relatively thick-walled, with only slightly upwardly diverging sides, terminating in a rim of generally equal height with respect to the supporting solid, round base. Such an overall structure is inherently stable, whether empty or filled; its thick walls permitting a significant amount of absorption to occur before the cup loses its shape.

The first preferred embodiment addresses both the noncommercial, home baking market and the smaller, fast food outlets, by providing a conveniently sized apparatus having a relatively small number of baking chambers in each tray assembly. Preferably provided with four baking chambers, the first embodiment is sized to conveniently fit into conventional ovens and microwaves as are found in most homes and the smaller commercial establishments. In the preferred embodiment, a sliding rod-type locking mechanism is provided, the configuration of which is discussed in further detail, below. In an alternative embodiment, a snap-type mechanism is provided, which is also briefly described below.

A second preferred embodiment addresses the large-scale, commercial market by providing a baking apparatus having a greater number of baking chambers. Preferably configured with 20 baking chambers, the second preferred embodiment is sized to accommodate the production of a large volume of individual food cups. While it is possible that the second preferred embodiment may also utilize a snap-type locking mechanism similar to the first alternative embodiment, a sliding rod-type locking mechanism is preferred instead, as is discussed in further detail, below. In both the first and second embodiments, the locking mechanism is advantageously utilized to facilitate the secured engagement of the upper and lower trays in both the transverse and the perpendicular directions.

A main source of improvement over the prior art is the invention's suitability for microwave use. Today a considerable number of homes and commercial bakers have microwave ovens at their disposal. Since cooking with microwave energy is such an effective and efficient method for preparing food, there is an increasing demand for baking products capable of microwave use. The present invention satisfies a part of that demand by constructing the tray assembly out of a "microwavable" plastic material. Preferably, the first and second embodiment may be constructed of a durable plastic suitable for conventional oven use—one that is capable of withstanding operating temperatures of up to 425° Fahrenheit. A preferred embodiment of the present invention is constructed of such a material as may be used for both conventional and microwave use. Accordingly, the present invention creates a cup-shaped comestible that satisfies all the desired characteristics discussed above while providing the user a diversity of choice in selecting either a conventional oven or a microwave oven for baking purposes.

Another source of improvement in the invention is the mechanism for locking the upper and lower tray into proper alignment, as referred to above. In the first preferred embodiment (having the smaller number of baking chambers), the lower tray is furnished with a plurality of arched tabs positioned central to each side of the lower tray. Each tab extends through a corresponding aperture in the upper tray, each compatibly positioned with the arched tabs of the lower tray. When assembled, the dual trays are secured in place by the insertion of preferably four T-shaped sliding rods, which are received by a corresponding arched tab. Likewise, the dual trays are disassembled simply by removing each of the sliding rods, and then lifting the top tray, separating it from the bottom tray. In an alternative embodiment, the trays are securely engaged by providing two or more sets of interlocking ridges so that the trays may be easily "snapped" into alignment, with the interlocking ridges also preventing any slipping or separation of the trays while baking.

In the second preferred embodiment, the lower tray is furnished with a series of arched tabs aligned in parallel rows. Each tab extends through a corresponding aperture in the upper tray, also similarly aligned in parallel rows. When assembled, the dual trays are secured in place by the insertion of a sliding rod, which is received by the exposed arch of each of the plurality of co-linear tab alignments. Likewise, the dual trays are disassembled simply by removing each of the sliding strips, and then lifting the top tray, separating it from the bottom tray.

When ready for use, an appropriate amount of baking mix is deposited in the base of each cavity in the lower tray. The upper tray is then placed on top, with the upper mold covers being received by the corresponding lower cavities. The upper and lower trays are then locked in place, and the tray assembly is placed in the oven—conventional or microwave. When baking is completed, the tray assembly is removed from the oven and unlocked, then the upper the lower trays are separated, exposed the baked food cup. After its release from the lower tray and cooling, the cup-shaped comestible is then removed for use in various culinary preparations.

It is understood that the present invention emcompasses other obvious embodiments that are not described herein, but which may be appreciated from the Detailed Description of the preferred embodiments discussed below.

DETAILED DESCRIPTION OF THE PREFERRED EMBODIMENT

Reference is now made to the figures, wherein like parts are designated with like numerals throughout.

Figure 1:
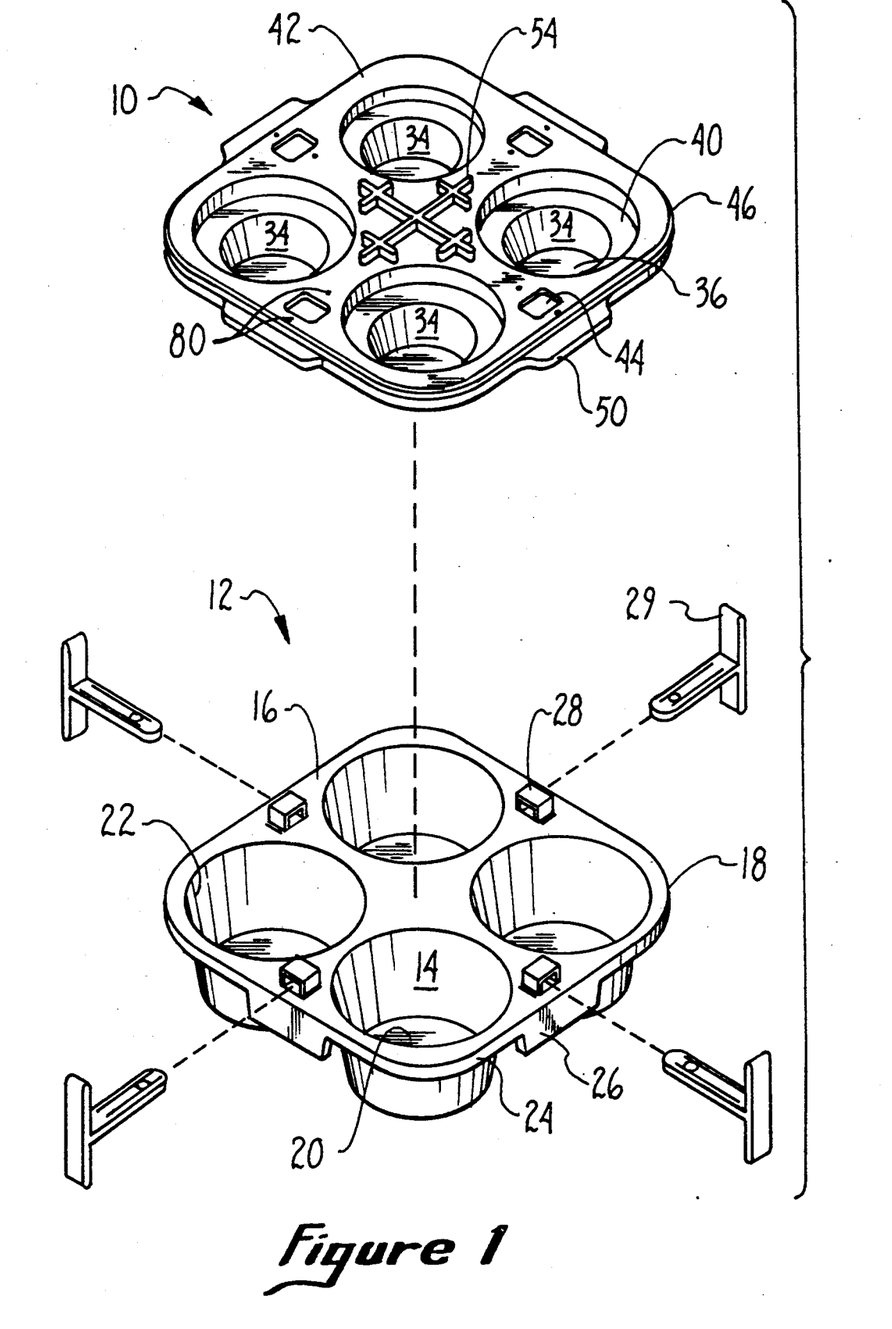
FIG. 1 is an exploded perspective view of an upper and a lower compatible tray of a first preferred embodiment.

The baking apparatus of the present invention depicted in FIG. 1 consists of an upper shaping tray 10 and a lower receiving tray 12 that are structurally configured to enable the two trays to be assembled in a nested, secured alignment. While FIGS. 1-4 illustrate the first preferred embodiment having a four baking-chamber matrix formed in square trays, and FIGS. 5-8 illustrate a second preferred embodiment having a twenty baking-chamber matrix in rectangular trays, it is to be understood and appreciated that the present invention includes any number of baking chambers arranged in any geometric configuration. The trays are preferably fabricated out of ULTEM-170-8102, a hard, durable plastic manufactured by General Electric of Pittsfield, Mass., using an injection molding technique to obtain a pair of trays having a general material thickness of 0.10 inches. The ULTEM-170-8102 was selected based upon its ability to be used in both a microwave oven and a conventional oven, withstanding environmental temperatures of up to 425 degrees.

Figure 2:
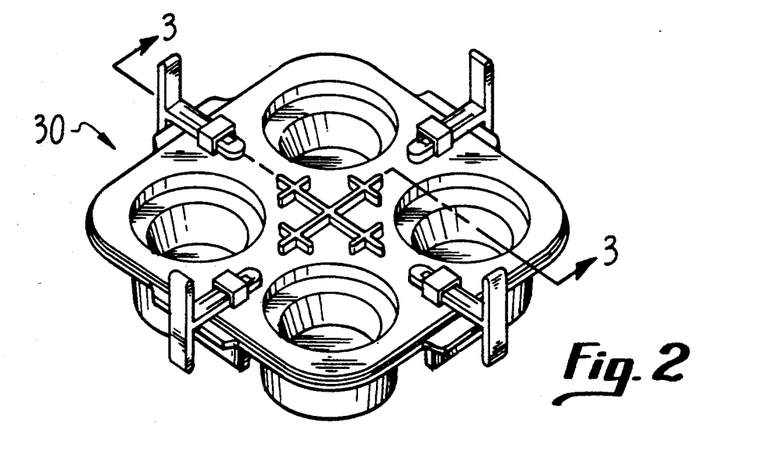
FIG. 2 is a perspective view of the first preferred embodiment of FIG. 1, showing the upper and lower compatible trays as assembled.

Referring now to FIGS. 1 and 2, it may be seen that the receiving tray 12 of the first preferred embodiment has formed therein a plurality of cylindrical, cup-shaped vessels 14 closely aligned in a rectilinear matrix or grid. While 4 vessels are shown, it is contemplated that a greater number of vessels may be incorporated therein, such as nine in a three by three configuration. It is also contemplated that other embodiments of the present invention will distribute the plurality of vessels 14 in an offsetting alignment, wherein adjacent rows of vessels are parallel along one axis but not aligned along a second axis perpendicular thereto. For example, instead of three rows with three vessels in each row, it is possible to arrange a fewer number of the vessels in a matrix of three rows of three, two, and three vessels, respectively, thereby obtaining a greater "packing" efficiency of the vessels and reducing the size of the trays.

Figure 3:
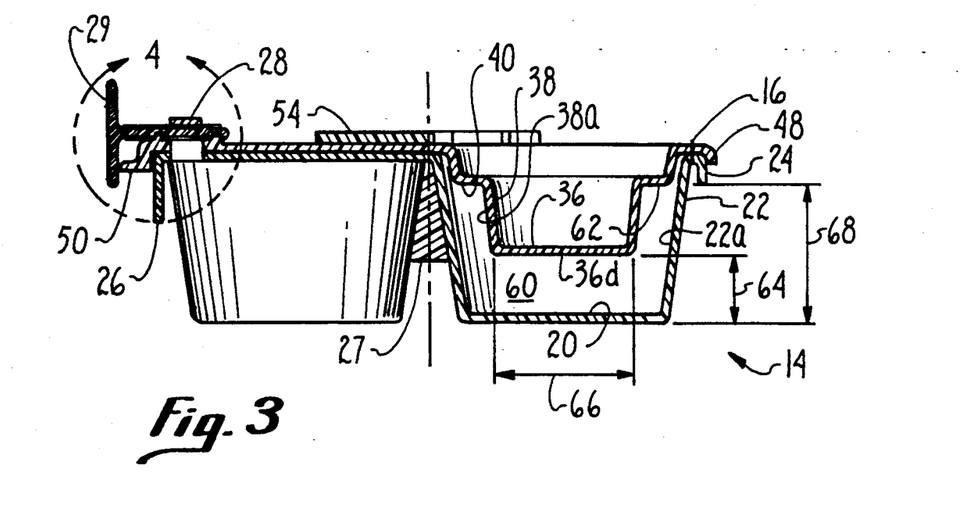
FIG. 3 is a sectional view in elevation, taken along line 3—3 of FIG. 2.

The cup-shaped vessels 14 of the first preferred embodiment are formed within a first planar support 16 that surrounds and interconnects the vessels 14. In order to reduce both diagonal dimensions and eliminate unnecessary material, the lower receiving tray 12 may be configured to coincide with the shape of a corner vessel, creating a plurality of four arcuate corners 18. In the embodiment of FIGS. 1-3, each vessel 14 is defined by a flat, circular base 20 and an upwardly diverging conical wall 22. However, the vessels 14 may be constructed in various other geometric configurations, such as a cylinder with parallel sides or a cube, without departing from the teachings of the present invention.

Referring momentarily to FIG. 3, it may be seen that the first planar support 16 is curved downwardly along its edge, forming a first rim 24. On at least two, but preferably four, sides of the receiving tray 12 a bearing surface 26 is formed along a short segment of the rim 24 and extends further from the first planar support 16 (shown in both FIGS. 1 and 3). The bearing surface 26 is positioned along the rim 24 and preferably in-between two adjacent vessels 14. For a receiving tray having four vessels 14, the bearing surface is positioned central to each side of the receiving tray 12. Alternatively, a receiving tray 12 having nine vessels 14, will have a bearing surface 26 preferably positioned one-third of the distance along a side.

In the first preferred embodiment, the receiving tray 12 is structurally enhanced with a plurality of reinforcement webs 27 that interconnect each vessel 14 as well as connecting the bearing surface 26 with an adjacent vessel 14. Extending upwardly from the first planar support 16 in preferably four positions proximal to each bearing surface 26 are raised eyelets 28 having a generally rectangularly arched shape. Each raised eyelet 28 is configured to accept a locking rod 29 which slidably engages the eyelets 28 as described further below in association with FIG. 4.

Referring again to FIG. 1, an upper shaping tray 10 is shown having dimensions that are structurally compatible with the structures and dimensions of the lower receiving tray 12. The upper shaping tray 10 is positioned above and received by the lower receiving tray 12, forming a nested, interlocking assembly 30 (FIG. 2). The assembly and disassembly of the two-tray assembly 30 will be discussed in further detail below in association with FIG. 3.

As shown in FIG. 1, the upper shaping tray 10 has formed therein a plurality of mold caps 34, which are closely arranged in a matrix or grid of dimensions and alignment such that the mold caps 34 fit concentrically within the vessels 14 of the bottom receiving tray 12 upon formation of the interlocking assembly 30 (FIG. 2). In the preferred embodiment, the mold caps 34 are defined by a flat central bottom 36 and upwardly diverging conical side walls 38. Again it is contemplated that other shapes may be utilized for the mold caps 34 compatible with like shapes for the vessels 14 of the lower receiving tray 12. Each mold cap is further defined by a recessed annular rim 40 formed along it upper periphery.

Surrounding the mold caps 34 is a second planar support 42 interconnecting each mold cap 34. Along each side of the upper shaping tray 10 is formed a thumb-engaging aperture 44, which is positioned at a lateral location on the second planar support 42 that corresponds to the location of the bearing surface 26 of the lower receiving tray 12. For a shaping tray having four mold caps, the thumb engaging aperture 44 is likewise preferably placed at a position central to the sides of second planar support 42. Similarly, a second plurality of arcuate corners 46 of the upper shaping tray 10 are formed to coincide with both the shape of a corner mold cap and with its corresponding arcuate corner 18 formed in the lower receiving tray 12.

Referring momentarily to FIG. 3, it may be seen that the second planar support 42 is turned downward along a portion of its periphery to form a second rim 48, which compatibly mates with the first rim 24 of the lower receiving tray 12. Along the balance of the periphery of second planar support 42 are provided four gripping extensions 50, each extending outwardly and at a location that corresponds to the lateral location of the bearing surface 26 formed on the receiving tray 12 (shown in FIGS. 1, 2, and 3). It is contemplated that in another embodiment, only two gripping extensions 50 are provided, one on each of opposing lateral sides of the shaping tray 10.

Referring to FIGS. 1 and 2, it may be seen that the first preferred embodiment includes a plurality of raised reinforcement ridges 54 provided to strengthen the shaping tray 10. Although shown configured in a perpendicular, cross-shaped arrangement, the reinforcement ridges 54 may be formed in any one of a variety of patterns corresponding to particular strengthening requirements.

Referring now to FIG. 3, the engagement of the shaping tray 10 with the receiving tray 12 forms a plurality of cavities or baking chambers 60, defined by an inner surface 22a of the first conical wall 22 of the receiving tray vessels 14 and an exterior surface of the second conical wall 38 of the shaping tray mold caps 34. An upper side-wall portion 62 of the baking chamber 60 is defined by an exterior portion of the recessed rim 40 surrounding the mold cap 34 of shaping tray 10. A base portion 64 of the baking chamber 60 is defined by a lower surface 36a of the central bottom 36 of the shaping tray 10 and the upper surface of the flat circular base 20 of the lower tray 12. In the preferred embodiment, the baking chamber side wall 62 and the base 64 are of a relatively thick dimension with respect to the baking chamber average diameter (identified by reference numeral 66) and height (identified by reference numeral 68). In addition, the baking chamber 62 and base 64 are preferably of uniform thickness. For example, to obtain a baked cup having an outer diameter of 3.875 inches, a height of 2.250 inches, a side wall thickness of 0.750 inches, and a base thickness of 1.00 inches, the cup-shaped vessels of the receiving tray would have an inner diameter of 3.175 inches at the base and of 3.875 inches at the rim, and the mold caps of the shaping tray would have an outer diameter of 2.30 inches at the central bottom and 3.50 inches at recessed annular rim. It is to be understood that various other shapes and relative thicknesses of the baking chambers are contemplated by the present invention.

Figure 4:
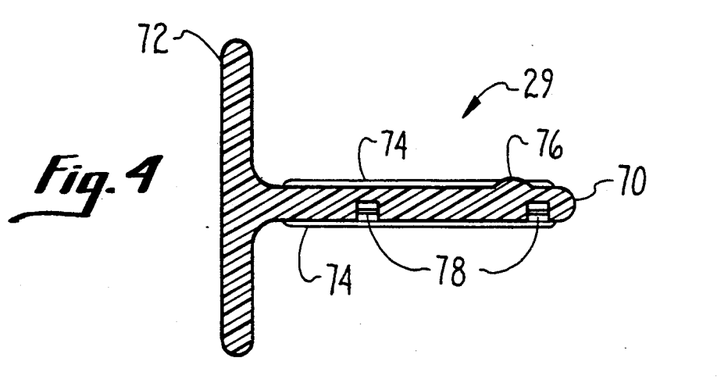
FIG. 4 is an enlarged side elevational view of the T-shaped locking rod shown in circle 4 of FIG. 3.

Referring to FIG. 4, the details of the locking rod 29 may be appreciated. The locking rod comprises generally a T-shaped configuration further comprising a web 70 and a flange 72. Extending outwardly along the top and bottom surface of the web 70 are a plurality of longitudinal ridges 74 permit a frictional engagement with the raised eyelet 28. Proximal to the forward end of the locking rod 29 and distal from the flange 72 is an annular projection 76 positioned on the upper surface of the web 70 to engage an interior side of the raised eyelet 28 when the locking rod 29 is fully inserted therein.

Extending inwardly from the bottom surface of the web 70 are a plurality of locking apertures 78 each configured to accept one of an equal number of raised projections 80 (see FIG. 1) positioned integral with the second planar surface 42. The raised projections 80 are each positioned adjacent to opposing sides of thumb aperture 44. When the locking rod 29 is fully inserted within the raised eyelet 28 (see FIG. 3), the locking apertures 78 securely engage the raised projections 80, thereby restricting lateral movement of the locking rod 29 while the baking tray assembly 30 is in use. When it is desired to remove the locking rods 29 from the raised eyelets 28, the user need merely grip the flange 72 and pull.

It is contemplated that in another embodiment, a different locking mechanism is provided, wherein compatible surfaces on the upper and lower tray engage in a snap-fit manner. For example, it is contemplated that the upper shaping tray be provided with a downwardly projecting engaging surface having a lateral ridge extending inwardly across the bottom. Correspondingly, the lower receiving tray is provided with a downwardly projecting receiving surface, whereby the lateral ridge may engage the bottom edge of the receiving surface when the two trays are assembled. When the upper shaping tray is placed completely over the lower receiving tray, the lateral ridge "snaps" below the receiving surface thereby locking the two trays together. In order to disassemble the trays, the engaging surface is urged outward drawing the lateral ridge away from the receiving surface and permitting the user to separate the trays. Other locking mechanisms may likewise be used without departing from the teachings of the present invention.

Assuming the use of the bakeware embodiment depicted in FIG. 2, other preferred dimensions include an overall dimension of 9.50×9.50×2.70 inches when the trays are interlocked with one another (for baking or storage). Four vessels are provided, shown in FIG. 2, each having a bottom outside diameter of 3.4 inches and a top diameter of 3.45 inches, with spacing across the tray designed to provide a minimum distance of 0.850 inches from the nearest adjacent vessel and 0.650 inches from the outside rim. The reinforcement ridges are centrally located with respect to adjoining mold caps, have a length of approximately 3.50 inches (terminating in a cross-shaped end, with arms of length 0.850 inches, and project above the surface of the tray approximately 0.10 inches. The bearing surface on the lower tray projects approximately 0.375 inches down and interengages with a gripping extension that projects approximately 0.220 inches downwardly and 0.220 inches outwardly. Both the gripping extension and the bearing surface have a general thickness of 0.10 inches.

The raised eyelets 28 have dimensions of 0.625×0.750×0.400 and have a thickness of 0.120 inches. The locking rod 29 is of generally T-shaped configuration having overall length of 1.71 inches, width of 0.50 inches and thickness of 0.180 inches. The flange of the locking rod is of equal width and thickness and has a length of 1.50 inches.

When preparing to use the baking apparatus of the first preferred embodiment, the user places an appropriate amount of a prepared sweetened or un-sweetened dough, such as Devil's Food Mix, manufactured by General Mills Corp. of Minneapolis, Minn. and Cornbread, manufactured by Dromedary of San Francisco, Calif. in each of the vessels 14 in the bottom receiving tray 12. The upper receiving tray 10 is then placed on top and securely engaged with the bottom receiving tray 12, with the receiving tray rim 24 and the shaping tray rim 48 assisting, upon contact, in the alignment of the upper and lower trays 10, 12 and of the shaping tray mold caps 34 within a corresponding receiving tray vessel 14. The shaping tray 10 is secured by the slidable engagement of each locking rod 29 with a corresponding raised eyelet 28. The nested, interlocking assembly 30 is then placed in an oven for baking. For such an assembly having the general outer dimensions of 9.50×9.50×2.70 and inner vessel diameters of 3.875 inches, baking times of approximately 15.0 minutes at 360° in conventional ovens and 4 minutes at a high heat setting of 600 watts in microwave ovens has been found to be appropriate for baking the dough. Naturally, as is always the case with baked goods, baking times will vary somewhat, and the only way to determine whether the cake is done is to remove the assembly from the oven, separate the upper and lower trays, and visually inspect the cake dough.

When it is desired to disassemble the trays, the user first removes each of the locking rods 29 from the corresponding eyelets 28. Next a thumb is placed over the top of each of two opposingly-positioned raised eyelets 28, by simultaneously pressing downwardly on the raised eyelets 28 while the fingers pull up on the gripping extensions 50, the upper and lower trays 10,, 12 separate with the raised eyelets withdrawing from each corresponding thumb engaging aperture 44 [with the fingers grasping against the gripping extensions 50]. Depending upon how tightly the trays are bound together following baking, it may be necessary to loosen the trays initially by following the above steps on two of the four opposing raised eyelets and then turning the tray assembly 90° to repeat the process with the other two raised eyelets, thereby achieving complete separation of the two trays.

Figure 5:
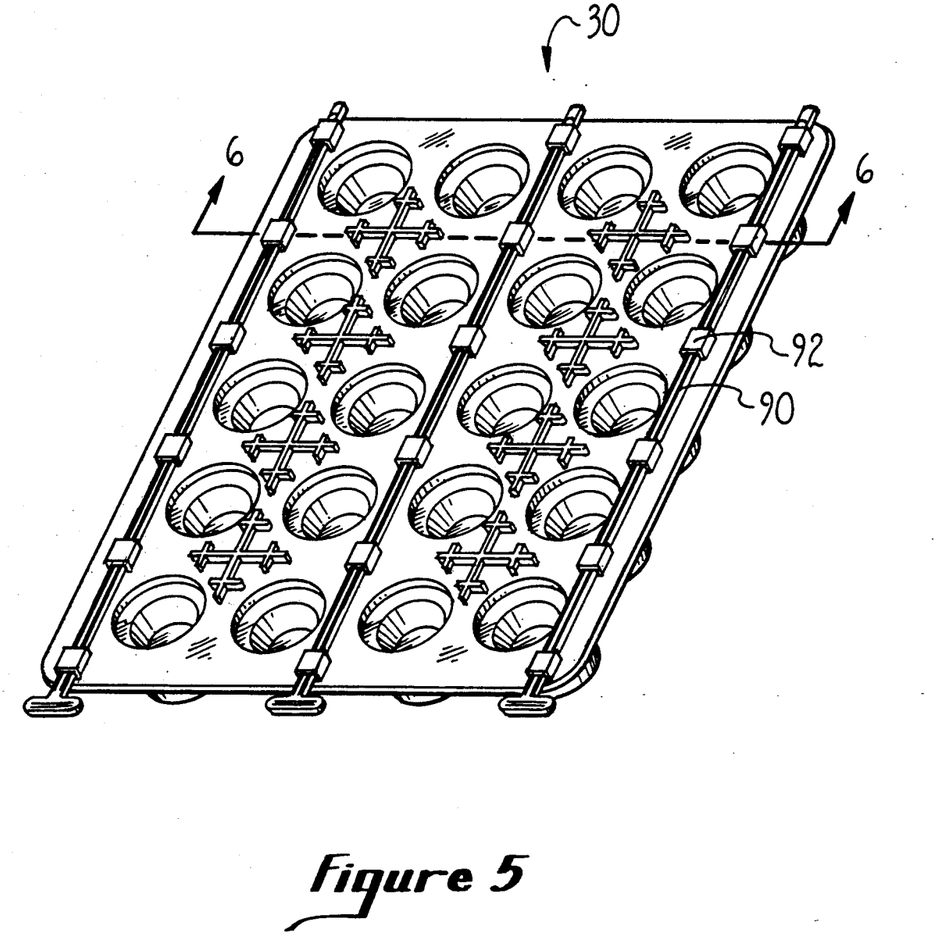
FIG. 5 is a perspective view of an upper and lower tray assembly, in accordance with a second preferred embodiment of the present invention.
Figure 6:
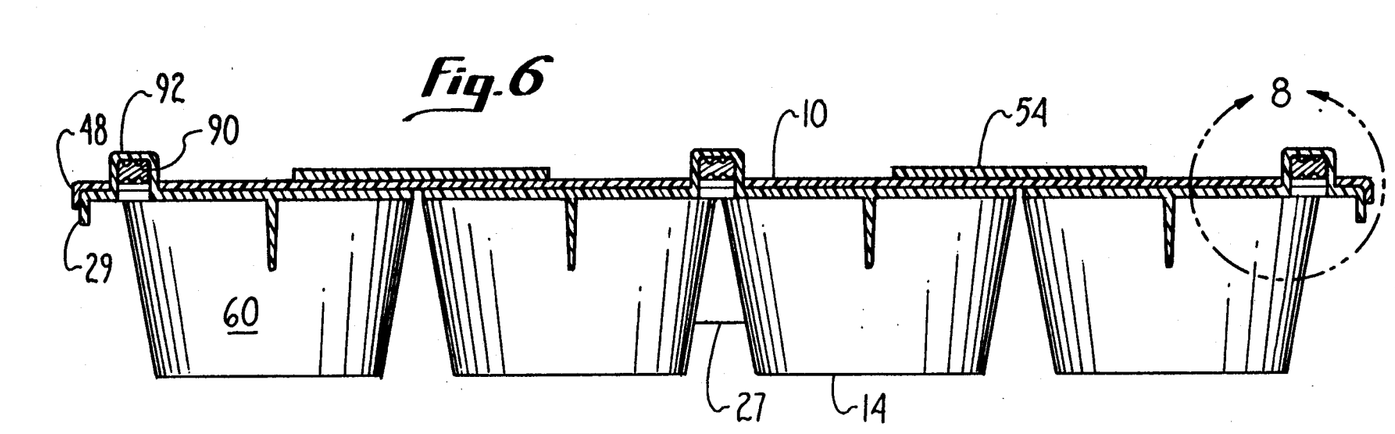
FIG. 6 is a sectional view in elevation taken along lines 6—6 of FIG. 5.

Referring now to FIGS. 5 through 10, as may hereinafter be appreciated, the second preferred embodiment of the present invention is directed towards commercial use. A greater number of baking chambers 60 are provided by the nesting assembly 30. In FIG. 5, the second preferred embodiment is shown having twenty baking chambers 60 aligned in a rectilinear matrix. However, it is to be understood and appreciated that the number of baking chambers illustrated in FIG. 5, or elsewhere in the present application, is not intended to be viewed as a limitation upon the invention but merely as an illustrative number for purposes of providing a detailed description of the invention. Any number of baking chambers may be utilized.

It may be appreciated from the following description that the first and second embodiments are virtually identical in their configuration of elements, aside from the number of baking chambers provided. Therefore, for purposes of clarity, those structures of the second embodiment (FIGS. 5-8) that are functionally equivalent to those of the first embodiment (FIGS. 1-4) will be identified using the previously introduced reference number designations.

FIG. 5 illustrates the nested assembly 30, having twenty baking chambers 60 (not specifically shown in FIG. 5) positioned in a matrix comprising four rows of five baking chambers 60 each. Matrices having different row arrangements are also possible, for example, it is contemplated that the baking chambers 60 may be positioned in an offsetting alignment, wherein adjacent rows of baking chambers are parallel along one axis but not along an axis perpendicular thereto. For example, instead of four rows of five baking chambers 60 each, as shown in FIG. 5, it is possible to arrange the baking chambers 60 in a pattern of four rows of five, four, five, four and five baking chambers 60, respectively, thereby permitting closer association of the baking chambers 60 and reducing the size of the tray.

As shown in FIG. 5, the similarities between the first and second preferred embodiments are readily apparent. The nested assembly 30 comprises two interlocking compatible trays wherein the lower receiving tray 12 has a plurality of vessels 14 arranged in a grid or matrix and the upper shaping tray 10 has a plurality of corresponding mold caps 34 that are located on the shaping tray 30 in a manner that assures concentric alignment with the vessels 14. Surrounding both the vessels 14 and the mold caps 34 are the first planar support 16 and the second planar support 42, respectively, each having the corresponding rims 24, 46. When the trays 10,12 are assembled, the rims 24, 46 slidably engage, assisting in the alignment of the compatible trays 10, 12.

As with the first preferred embodiment, upon assembly, the two trays 10, 12 form a plurality of baking chambers 60 defined by the exterior surface of the mold caps 34 and the interior surface of the vessels 14. The configuration of the baking chambers 60 are as described for the first preferred embodiment and as illustrated in FIG. 3. In the second preferred embodiment, a plurality of webs 28 (not shown in FIGS. 5-8) are formed in the lower receiving tray 12 in a manner equivalent to that shown in FIG. 3 to provide reinforcement between the vessels 14. Similarly, a plurality of raised ridges 54 are formed in the upper shaping tray 10 to strengthen the tray.

As with the first preferred embodiment, a locking mechanism is provided on the second preferred embodiment to counter the forces of rising dough. However, as the bakeware increases in size, not only do the forces created by the rising dough increase, it becomes more difficult to apply the resistive force only from the periphery of the tray, as is accomplished in the first preferred embodiment. Without some means of applying the resistance directly to the central portions of the two compatible trays, the rising dough in each baking chamber 60 will urge the trays apart. The baking chambers 60 become deformed, as do the shapes of the baked comestibles. As a result, while the same general locking principle of the first preferred embodiment is employed with respect to the second preferred embodiment, a slightly different locking configuration is provided.

The dual trays of the second preferred embodiment, as illustrated in FIGS. 5-8, are shown secured together by a plurality of locking rods 90 slidably inserted through a series of concentrically aligned eyelets 92, similarly shaped as the raised eyelets 28 of the first preferred embodiment, located across the top of the nested assembly 30 and in parallel alignment with one another. The eyelets 92 are preferably integrally formed in the first planar support 16 of the lower receiving tray 12. When brought into assembly with the upper shaping tray 10, the eyelets 92 protrude through a plurality of corresponding thumb engaging apertures 44 formed in the second planar support 42 of the upper shaping tray 10.

Figure 7:
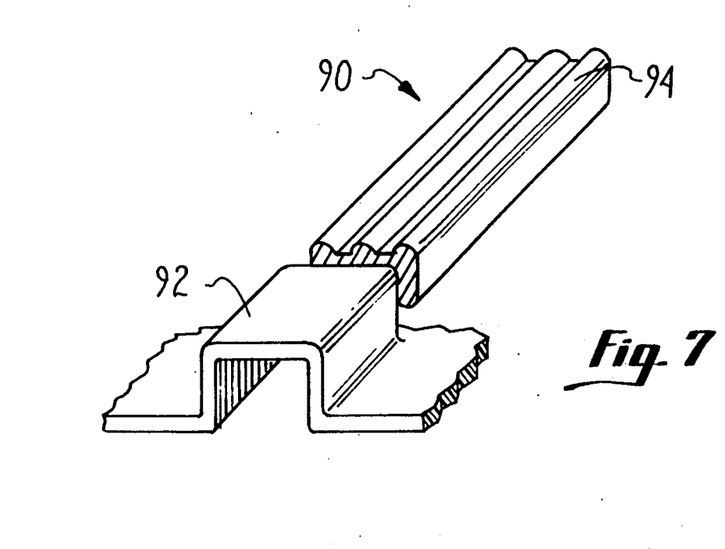
FIG. 7 is an enlarged, partial perspective view, showing a raised eyelet structure of the bottom tray in accordance with the present invention.
Figure 8:
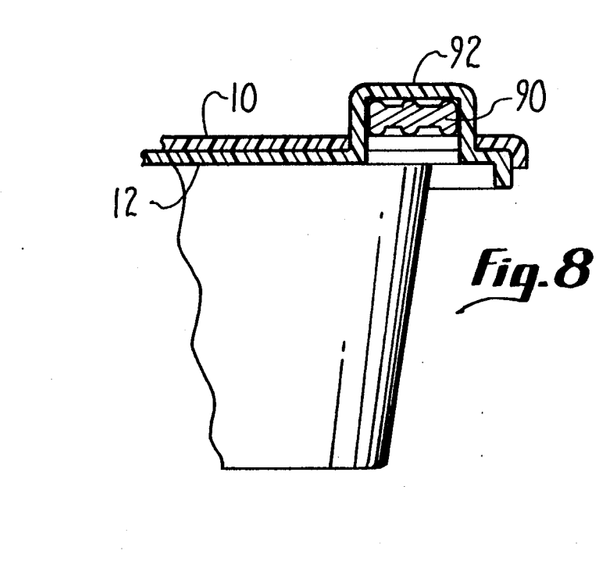
FIG. 8 is an enlarged view, in section, of the locking mechanism shown in circle 8 of FIG. 6.

As shown in FIG. 7, the locking rods 90 of the second preferred embodiment are provided with a series of ribs 94 that extend along the length of the locking rods 90 and which strengthen the locking rods 90 against excessive bending. While the second preferred embodiment provides for three parallel locking rods 90, it is contemplated that other embodiments will provide a greater or lesser number of locking rods, depending upon the number of baking chambers and the structural ability, based upon the overall dimensions of the bakeware, to maintain an effective engagement of the trays during baking. In addition, it is possible that one or more locking rods 90 may be positioned orthogonal to each other, rather than the parallel arrangement shown in FIG. 5.

A presently preferred size for the bakeware shown in FIG. 5 provides for overall dimensions of 23.5×18.4×2.70 when the upper and lower trays are interlocked with one another. Twenty vessels are provided, shown in FIG. 5, each having a bottom outside diameter of 3.40 inches and a top diameter of 3.45 inches, with spacing across the tray designed to provide a minimum distance of 0.90 inches from the nearest adjacent vessel and 1.10 inches from the outside rim. In order to create a baking chamber of the appropriate volume of 10 ounces, the mold caps have a maximum depth of 1.50 inches and an outer diameter at that level of 2.30 inches, with a recessed annular rim located 0.250 inches down from the second planar surface of the tray, and an outer diameter at this point of 3.50 inches. The reinforcement ridges are centrally located with respect to adjoining mold caps, have a length of approximately 3.50 inches (terminating in a cross-shaped end, with arms of length 0.850 inches, and project above the surface of the tray approximately 0.125 inches. The eyelets rise 0.150 inches from the surrounding first planar surface of the tray, and project approximately 0.375 inches above the second planar surface when inserted through the eyelet aperture. The locking rods are preferably 25.0 inches in length and 0.70 inches in width, with the ribs projecting approximately 0.04 inches from the surface of the surrounding locking rod.

When preparing to use the baking apparatus of the second preferred embodiment, the user deposits a serving of a prepared food mix, as with the first preferred embodiment, in each of the vessels 14 of the bottom receiving tray 12, preferably in a centered position. The top tray 10 is then placed on top and securely engaged with the bottom receiving tray 12 wherein the receiving tray rim 24 and the shaping tray rim 48 slidably contact, automatically aligning each shaping tray mold cap 34 within each corresponding receiving tray vessel 14. The shaping tray 10 is secured to the receiving tray 12 by the inserting the locking rods 90 into each set of arched eyelets 92, thereby locking the dual trays together. When it is desired to disassemble the trays, the user simply removes the locking pins and pulls the top shaping tray 10 away from the bottom receiving tray 12 exposing the baked comestible cups.

Figure 9:
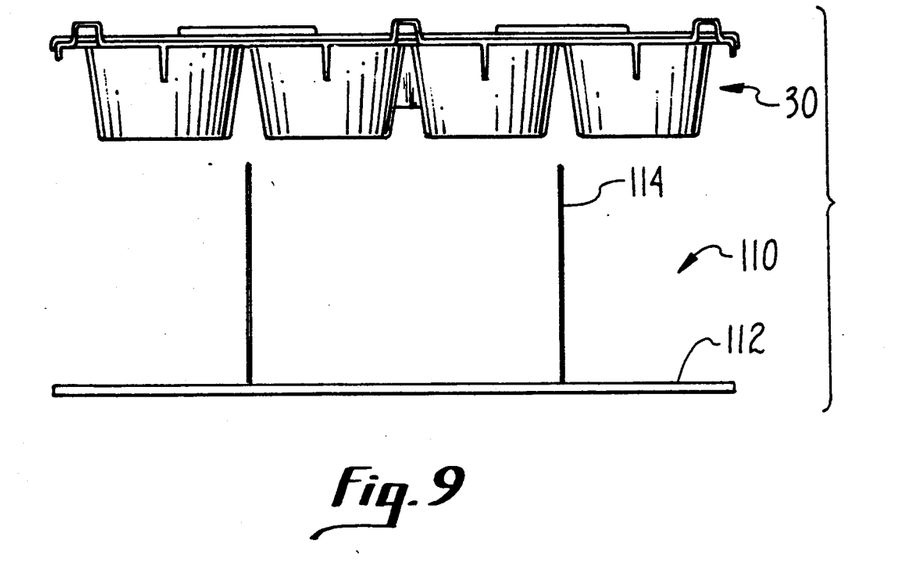
FIG. 9 is a side elevational view of the second preferred embodiment in position over a separating jig.
Figure 10:
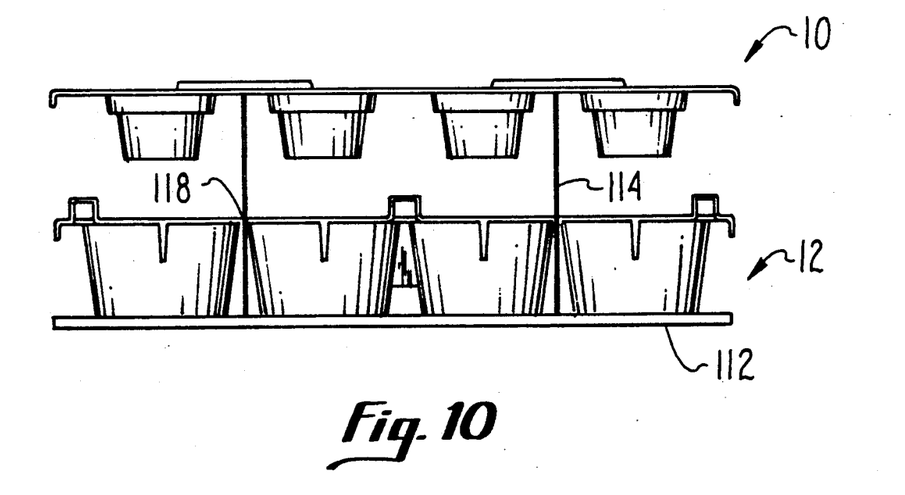
FIG. 10 is an exaggerated side elevational view of the second preferred embodiment showing the trays separated by the separating jig.

It may be appreciated that occasionally, the dough rising within the tray assembly 30 may substantially bind the two trays 10, 12 of the second preferred embodiment together so as to prevent ready separation upon removing the locking rods 90. In such instances a supplemental device is necessary to assist in separating the trays and thereby exposing the baked comestibles. Referring to FIGS. 9 and 10, a means for facilitating the separating step is illustrated.

In FIG. 9 a conventional jig 110 is shown having a generally flat rectangular base 112 and a plurality of upwardly extending rods 114 secured perpendicular thereto. The rods 114 are positioned on the base 112 to correspond with a plurality of apertures 118 (shown in FIG. 10) located on first planar support 16 of receiving tray 12. Where it is necessary to utilize a jig 110 to assist in separating the trays, the tray assembly 30 may be positioned above the jig 110 so that apertures 118 align with rods 114. When the tray assembly 30 is sufficiently lowered, the rods 114 will extend through apertures 118 and engage the bottom surface of second planar support 42 of shaping tray 10. As the tray assembly 30 is released by the user, the weight of the baked comestibles in the receiving tray 12 will exert a downward pressure, thereby urging the two trays apart. When the force of the comestibles in binding the two trays together is sufficiently overcome by their own weight, the trays will separate as shown in FIG. 10. The receiving tray 12 will simply come to rest on the jig base 112 leaving the shaping tray 10 perched atop the rods 114.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An assembly of compatible trays for baking cup-shaped comestibles comprising:
   a bottom receiving tray having a plurality of vessels interconnectably surrounded by a first planar support, said first planar support having a first rim downwardly extending perpendicular to, and along a perimeter of, said first planar support;
   a top shaping tray having a plurality of mold caps compatibly aligned with the vessels of the receiving tray, said mold caps interconnectably surrounded by a second planar support, said second planar support having a second rim downwardly extending perpendicular to, and along a perimeter of, said second planar support, wherein the first rim and said second rim are slidably engaged when the top shaping tray is assembled with the bottom receiving tray;
   a plurality of baking chambers having bottom and outer surfaces shaped by said bottom receiving tray, and top and inner surfaces shaped by said top shaping tray, when the top shaping tray is securely assembled atop the bottom receiving tray;
   a plurality of raised arch eyelets each extending upwardly from the first planar support and a corresponding number of apertures in the second planar support for individually receiving each said eyelet, such that said eyelet has a portion extending above the second planar support; and
   a plurality of locking rods, each of said locking rods having a first portion slidably engageable with one of said eyelets and a second portion at an angle relative to the first portion which can be placed in contact with an edge of the top tray when said trays are securely engaged, for locking the receiving tray to the shaping tray.

2. The baking apparatus of claim 1 wherein the vessels and mold caps are arranged in a grid alignment.

3. The baking apparatus of claim 1 wherein the vessels are integrally interconnected with each other by a plurality of reinforcing webs.

4. The baking apparatus of claim 1 wherein a plurality of raised strengthening ridges extend upward from an upper surface of the top shaping tray.

5. The baking apparatus of claim 1 wherein the baking chambers each have a side wall and a base, the breadth of said baking chamber side wall and of the base being relatively large in comparison to the height and the average diameter of said baking chamber.

6. The baking apparatus of claim 1 wherein a plurality of raised strengthening ridges extend upward from an upper surface of the top shaping tray.

7. The baking apparatus of claim 6 wherein the raised strengthening ridges are arranged in an orthogonal pattern.

8. The baking apparatus of claim 1 wherein the locking rods are longitudinally ribbed.

9. The baking apparatus of claim 1 wherein said corresponding number of apertures in the second planar support for individually receiving each said eyelet comprise thumb-engaging apertures located proximal to the second rim.

10. The baking apparatus of claim 1 wherein said bottom receiving tray and said top shaping tray are fabricated out of a hard, durable plastic.

11. The baking apparatus of claim 10 wherein the plastic material is capable of withstanding microwave use.

12. The baking apparatus of claim 11 wherein the plastic material is capable of withstanding both microwave and conventional convection oven use.

13. The apparatus of claim 1, wherein said angle of the second portion to the first portion of the locking rod is orthogonal.

14. An apparatus for baking cup-shaped comestibles comprising:
   an assembly comprising a top shaping tray and a bottom receiving tray, each constructed of convection oven-durable plastic, said bottom receiving tray having a plurality of vessels formed therein and said top shaping tray having a plurality of mold caps compatibly aligned with the vessels of the receiving tray,
   a plurality of interior baking chambers defined within the assembled top shaping tray and bottom receiving tray, each formed by the interengagement of one of said vessels with a corresponding one of said mold caps;
   a plurality of raised arch eyelets each extending upwardly from a surface of the bottom receiving tray and a corresponding number of apertures in the top shaping tray for individually receiving each said eyelet, such that said eyelet has a portion extending above the top shaping tray; and
   a plurality of locking rods, each of said locking rods having a first portion slidably engageable with one of said eyelets and a second portion at an angle relative to the first portion which can be placed in contact with an edge of the tray when said trays are securely engaged, for locking the receiving tray to the shaping tray.

15. The baking aperture of claim 14 wherein the plurality of vessels of the bottom receiving tray is surrounded by a first planar support, said first planar support having a first rim downwardly extending perpendicular to, and along a perimeter of, said first planar support.

16. The baking aperture of claim 15 wherein the plurality of mold caps of the top shaping tray is interconnectably surrounded by a second planar support, said second planar support having a second rim downwardly extending perpendicular to, and along a perimeter of, said second planar support.

17. The baking aperture of claim 16 wherein the first rim and said second rim are slidably engaged when the bottom receiving tray and upper shaping tray are assembled.

18. The baking apparatus of claim 17 wherein the baking chambers each have a side wall and a base, the breadth of said baking chamber side wall and of the base being relatively large in comparison to the height and the average diameter of said baking chamber.

19. The baking apparatus of claim 18 wherein the vessels are integrally interconnected with each other by a plurality of reinforcing webs.

20. The baking apparatus of claim 19 wherein the mold caps have a recessed annular rim along a periphery.

21. The baking apparatus of claim 20 wherein each of a plurality of thumb-engaging apertures are defined by the apertures in the top shaping tray.

22. The baking apparatus of claim 21 wherein the locking rods are longitudinally ribbed.

* * * * *